United States Patent
Bitler et al.

[11] Patent Number: 5,942,023
[45] Date of Patent: *Aug. 24, 1999

[54] PROCESS FOR RECOVERING METALS FROM ELECTRIC ARC FURNACE (EAF) DUST

[75] Inventors: John A. Bitler, Denver; John P. Baranski, Sinking Spring, both of Pa.; Harold R. Larson, North Quincy, Mass.

[73] Assignee: Exide Corporation, Reading, Pa.

[*] Notice: This patent is subject to a terminal disclaimer.

[21] Appl. No.: 08/946,583

[22] Filed: Oct. 7, 1997

Related U.S. Application Data

[63] Continuation of application No. 08/799,190, Feb. 12, 1997.

[51] Int. Cl.[6] ....................................................... C22B 7/02
[52] U.S. Cl. ............................ 75/10.19; 75/10.54; 75/961; 423/499.1
[58] Field of Search ............................... 75/10.19, 10.28, 75/10.54, 961; 423/499.1

[56] References Cited

U.S. PATENT DOCUMENTS

| | | | |
|---|---|---|---|
| 1,492,241 | 4/1924 | Carpenter et al. | |
| 1,515,616 | 11/1924 | Poppenhusen | |
| 1,715,262 | 5/1929 | White | |
| 2,049,633 | 8/1936 | Thomsen | |
| 2,756,044 | 7/1956 | Neumann | |
| 2,826,490 | 3/1958 | Neumann | |
| 3,561,684 | 2/1971 | Fischer et al. | 241/42 |
| 3,940,551 | 2/1976 | Ling et al. | 13/9 |
| 3,999,000 | 12/1976 | Stenkvist | 13/9 |
| 4,102,676 | 7/1978 | Jaquay | 75/77 |
| 4,115,109 | 9/1978 | Libach et al. | 75/77 |
| 4,177,061 | 12/1979 | Stenkvist et al. | 75/11 |
| 4,180,251 | 12/1979 | Jaquay | 266/172 |
| 4,229,271 | 10/1980 | Prengaman et al. | 204/114 |
| 4,310,351 | 1/1982 | Lieberman | 75/77 |
| 4,340,421 | 7/1982 | Bergsoe | 75/77 |
| 4,431,612 | 2/1984 | Bell et al. | 422/186.21 |
| 4,571,261 | 2/1986 | Buren et al. | 75/77 |
| 4,877,640 | 10/1989 | Muehlberger et al. | 427/34 |
| 4,957,551 | 9/1990 | Aune et al. | 75/657 |
| 5,122,181 | 6/1992 | Dube et al. | 75/10.21 |
| 5,203,908 | 4/1993 | Lindsay et al. | 75/10.35 |
| 5,284,503 | 2/1994 | Bitler et al. | 75/10.19 |
| 5,358,549 | 10/1994 | Nagel et al. | 74/414 |
| 5,439,498 | 8/1995 | Bitler et al. | 75/10.19 |
| 5,766,303 | 6/1998 | Bitler et al. | 75/10.19 |

FOREIGN PATENT DOCUMENTS

| | | | |
|---|---|---|---|
| 0216618 | 1/1987 | European Pat. Off. | |
| 2107470 | 2/1971 | Germany | 75/961 |

OTHER PUBLICATIONS

Wang et al, "Recovering Zn, Pb, Cd and Fe from Electric Furnace Dust", *Journal of Metallurgy*, pp. 42–45, Apr. 1990.

Bunney et al, "The Commercial Development of Plasma Technology: EAF Dust Application", *AIMF Conference*, San Diego, Mar. 1992.

Erriksson, "The Plasmazinc Process for Recovery of Zinc from Primary and Secondary Materials", *Zinc '85*, Ch. 52, pp. 827–839 (1985) No month.

Bygden et al, "Application of Kellogg's Model to the Slag–Fuming Practice in Sweden," *Zinc '85*, Ch 11, pp. 171–183 (1985) No month.

(List continued on next page.)

*Primary Examiner*—Prince Willis
*Assistant Examiner*—Tima M. McGuthry Banks
*Attorney, Agent, or Firm*—Nixon & Vanderhye P.C.

[57] ABSTRACT

Heavy metals substantially free from heavy metal chloride contaminants are recovered from electric arc furnace (EAF) dust by bringing the dust into contact with a carbonaceous reductant utilizing a plasma arc of a DC sealed atmosphere plasma arc furnace so as to volatilize (vaporize) the hazardous heavy metals therein, and then bringing the vaporized heavy metals into contact with an alkali metal gettering agent to thereby form alkali metal chlorides and thereby substantially inhibit the formation of heavy metal chlorides in the off-gas.

23 Claims, 1 Drawing Sheet

OTHER PUBLICATIONS

Penberthy, "Why Glass is a good Hose for Hazardous Waste", *Glass Industry,* pp. 22–24, May 1992.

Roy, "Cyclone Furnace Destroys Organics, Immobilizes Heavy Metals, Radionuclides", *Hazmat World,* pp. 59–60 (Aug. 1992).

"Waste Minimization—Selected Topics", *The Hazardous Waste Consultant,* pp. 1.22–1.24 (Sep./Oct. 1991).

"Plasma Gasification Could Set New Standards For Municipal Solid Waste Disposal", *Enresearch,* Ontario Ministry of Energy (1986) No month.

"Application of Plasma Technology in the Environmental Waste Processing Industry", *CMP Report No. 92–5* (Jul. 1992).

"Plasma Arcs Sputter New Waste Treatment", *Chemical Engineering,* pp. 32–35 (Dec. 1991).

Royer et al, "Control Technologies for Remediation of Contaminanted Soil and Waste Deposits at Superfund Lead Battery Recycling Sites," *J. Air Waste Manage. Assoc.,* pp. 970–980, 1992-

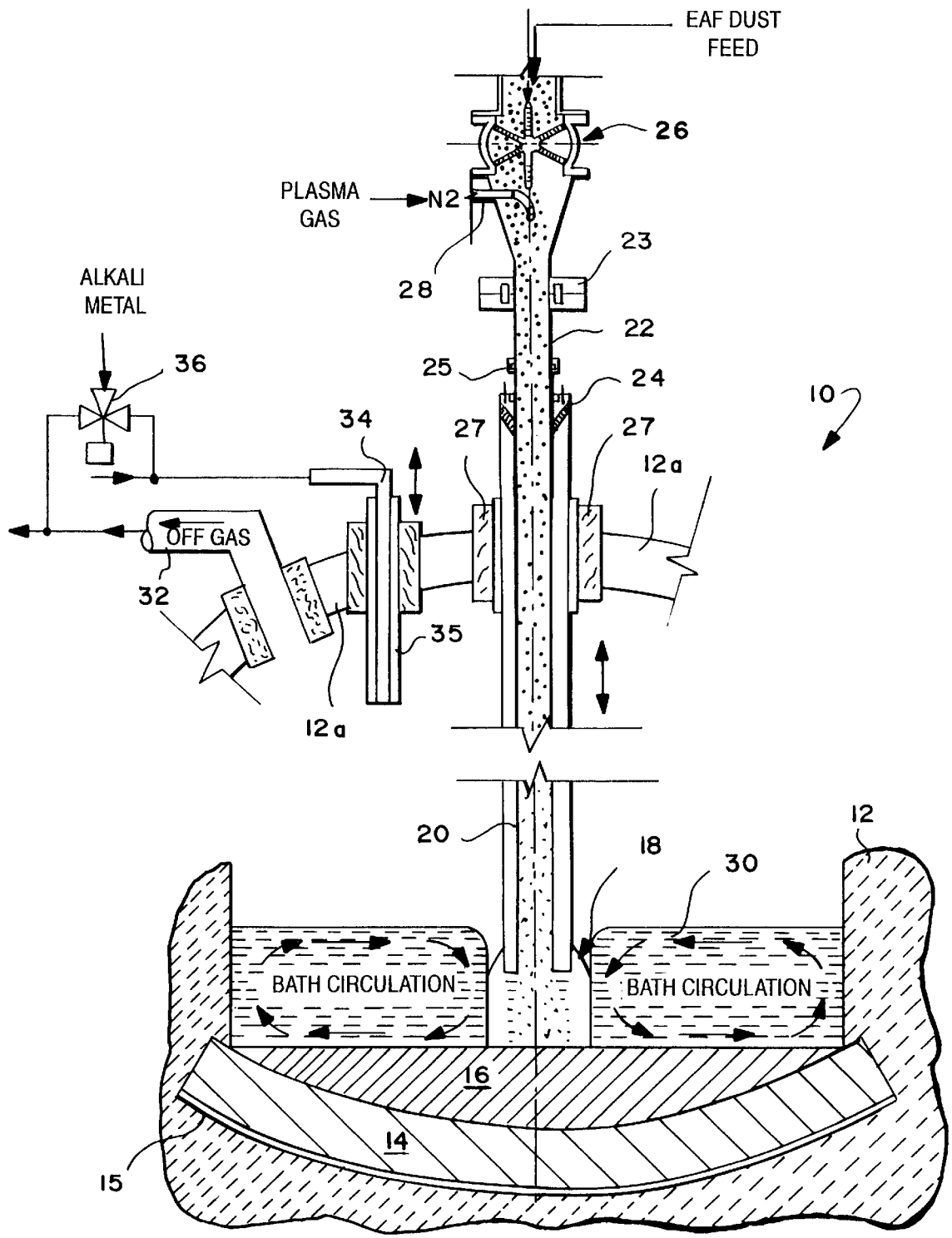

PROCESS FOR RECOVERING METALS FROM ELECTRIC ARC FURNACE (EAF) DUST

CROSS-REFERENCE TO RELATED APPLICATIONS

This is a continuation of U.S. patent application Ser. No. 08/799,190, filed Feb. 12, 1997.

This application may be deemed to be related to U.S. application Ser. No. 08/715,486 filed on Sep. 18, 1996, and its Provisional application Ser. No. 60/003,956 filed on Sep. 19, 1995, the entire content of each prior application being expressly incorporated hereinto by reference.

FIELD OF INVENTION

The present invention relates generally to the recovery of metals from electric arc furnace (EAF) dust. In a preferred embodiment, the present invention involves bringing EAF dust and carbonaceous reductant into contact with a DC arc of a DC sealed atmosphere arc furnace such that the metal constituents are recovered, including those metal constituents that are not volatilized (e.g., iron, nickel and cobalt), and those that are volatilized (e.g., lead, zinc and cadmium).

BACKGROUND AND SUMMARY OF THE INVENTION

EAF dust is a by-product of steel scrap smelting and is considered a "hazardous material" due to the presence of hazardous metals therein (e.g., heavy metals such as lead, zinc, cadmium and the like). In this regard, EAF dust that is obtained from processing ferrous steel scrap will have a "hazardous material" rating (i.e., K061 per U.S. Environmental Protection Agency Standards), due to the presence of lead, cadmium and/or zinc in addition to iron. A major source of K061-rated EAF dust is steel scrap that is mixed or coated with the elements that render dust hazardous. Salvaged ships, structural steel, galvanized steel and primarily automobile scrap are the major sources of feed to the smelting furnaces. Automobile scrap is, however, also a source of constituents used in plastic components found in the construction of automobiles. Thus, in addition to heavy metal contaminants, EAF dust could contain typically a meaningful amount of chlorine, usually on the order of about 2 wt. %, which originates from road salt that contaminates most scrap automobiles used as feed stock for the electric arc steel smelting furnace.

Broadly, the present invention involves the major recovery of the primary metals (e.g., iron, zinc, cadmium and lead) from the slag producing constituents in the EAF dust by bringing the dust into contact with a plasma arc of a DC sealed atmosphere plasma arc furnace so as to volatilize (vaporize) those metals having a vaporization point less than the lowest temperature of exposure within the furnace, and partition from the melt those constituents with a vaporization point higher than the lowest temperature of exposure within the furnace. Any halides, for example, chlorine, that may be present in the feed material, will vaporize such that the halide (chloride) ions are brought into contact with an alkali metal compound to form alkali metal chlorides and thereby to prevent substantially the formation of heavy metal chlorides.

In particularly preferred forms, the EAF dust is subjected sequentially to two high temperature zones within the furnace. The first high temperature zone is established immediately below the electrode in the plasma arc, while the second high temperature zone is in the form of a "slag" which circulates by induction and natural arc stirring relative to the first zone. The EAF dust and carbonaceous reductant is fed into the furnace through a hollow electrode member cocurrently with the plasma gas. As such, the EAF dust first encounter the ultrahigh temperature (e.g., greater than 3,000° F.) immediately below the electrode in the first high temperature (plasma) zone. The EAF dust encountering such high temperature will decompose rapidly so as to vaporize at least a portion of the hazardous metals contained therein.

The second high temperature zone is the gas phase above the molten slag. It will be at a temperature almost as hot as the slag—that is, at least about 3,000° F. Chemical decomposition reactions and metals vaporization are completed in the hot gas of the second high temperature zone. Furthermore, controlled additions of an oxidizing gas, such as oxygen, air, or steam, may be introduced into the gas space within the furnace through a cooled lance inserted through an auxiliary port in the roof of the furnace to partially combust any residual or excess carbon. The preferred embodiment utilizes a metered quantity of oxygen for this purpose so as to minimize the volume of off-gas produced. The produced off-gas, however, is brought into contact with an alkali metal compound (e.g., either in the furnace itself or in the off-gas discharge line) so as to covert the free chlorides therein to alkali metal chlorides. As such, free chlorides in the off-gas are prevented from reacting with the hazardous heavy metal vapors so that relatively pure heavy metals may be recovered (e.g., heavy metals and/or metal oxides substantially uncontaminated by metal chlorides). Furthermore, the furnace may be operated in an oxidizing or reducing condition as required to maximize the recovery of the metal constituents in the EAF dust feed.

The slag is essentially amorphous, and when cooled is non-leachable. Iron is recovered as iron metal for reuse.

These and other aspects and advantages of this invention will become more clear after careful consideration is given to the following detailed description of the preferred exemplary embodiments.

BRIEF DESCRIPTION OF THE DRAWINGS

Reference will hereinafter be made to the accompanying FIGURE which schematically depicts a cross-sectional view of a DC atmospherically sealed plasma arc furnace that may be employed in the practice of this invention.

DETAILED DESCRIPTION OF THE PREFERRED EXEMPLARY EMBODIMENTS

As noted briefly above, the process in accordance with the present invention necessarily employs a DC atmospherically sealed plasma arc furnace. DC plasma arc furnaces are, in and of themselves well known as evidenced from U.S. Pat. Nos. 3,940,551 and 3,999,000 (the entire contents of each being expressly incorporated hereinto by reference). A particularly preferred atmospherically sealed plasma arc furnace that may be used in the practice of the present invention is depicted in the accompanying FIGURE (see also, U.S. Pat. No. 4,177,061, the entire content of which is expressly incorporated hereinto by reference).

As is seen, the plasma arc furnace 10 includes a sealed refractory shell 12, it being understood that the complete shell is not depicted in the FIGURE for clarity of presentation. A conductive plate 14 with conductive refractories is embedded in the bottom of the shell 12 and supports a molten iron heel 16 which establishes a plasma arc zone 18 with the terminal end of the hollow graphite electrode 20. A conductive copper plate 15 supports the refractories of the conductive plate 14. A stationary feed conduit 22 coaxially mounted within the hollow graphite electrode enters the refractor shell roof 12a and is sealed by the refractory seal 27. The stationary feed tube is attached to the feed system through an electrically insulated joint 23. Also, the split clamp 25 provides for rapid disassembly to add electrodes.

The feed conduit 22 is coaxially, but slidably, coupled to the upper end of the electrode 20 by the adaptor/gas seal structures 24. The electrode 22 is itself sealed with respect to the furnace roof 12a by means of seal structures 27. In such a manner, therefore, the electrode 20 may be reciprocally moveable relative to the feed conduit 22 towards and away from the iron heel 16. A rotary valve 26 or other airlock feeder permits the EAF dust to be introduced into the interior of the furnace 10. Alternatively, the EAF dust may be introduced into the furnace through a feed port (not shown) located adjacently near the hollow electrode 20.

An inert gas port 28 downstream of the valve 26 permits an inert plasma gas (e.g., recycled off-gas, $N_2$ or the like) to be introduced into the furnace 110 s the plasma gas so as to allow for control over the furnace atmosphere (e.g., so as to create a controlled atmosphere within the furnace 10). The introduction of an inert gas into the furnace helps force the feed material into the plasma zone and cools the electrode for reducing graphite consumption in addition to reducing final off-gas volume discharge to atmosphere.

Controlled amounts of an oxidizing gas, such as oxygen, air, or steam, may be introduced into the gas space above the slag 30 within the furnace through a cooled lance 34 slidably provided in a sealed roof port 35. The preferred embodiment utilizes a metered quantity of oxygen for this purpose so as to minimize the volume of off-gas produced. The oxygen used, if any is proportional to the excess carbon in the charge mix.

The plasma gas which is introduced cocurrently with the EAF dust feed material at nozzle 28 through the hollow electrode 20 may be any inert gas, such as $N_2$, Ar or recycled off-gas for additional re-exposure to the plasma arc.

The plasma arc zone 18 is at a temperature above about 30,000° F. At such an ultrahigh temperature, the EAF dust introduced into the furnace 10 will thermodynamically be decomposed thereby volatilizing any heavy metal contaminants (e.g., lead, zinc or the like) that may be present therein. In addition, chloride ions may be liberated from the EAF dust (e.g., by virtue of the original scrap metal that gave rise to the EAF dust by-product during the original electric arc furnace steel smelting operation.

According to the present invention, any chloride atoms present in the off-gas exiting the furnace 10 through conduit 32 may be brought into contact with an alkali metal gettering agent, for example, an alkali metal oxide, hydroxide, carbonate. Preferred for the present invention are hydroxides and carbonates of sodium and potassium. The alkali metal gettering agent may be introduced directly into the furnace 10 through lance conduit 34 so as to be discharged into the space above the slag 30. Alternatively (or additionally), the alkali metal gettering agent may be diverted in whole or in part via valve 36 so as to be introduced into the off-gas conduit 32. The alkali metal gettering agent reacts with free chlorides present in the off-gas so as to form alkali metal chlorides and thus inhibits substantially the undesirable formation of heavy metal chlorides (e.g., lead chlorides, zinc chlorides and the like) which may contaminate the downstream recovery of heavy metals.

The alkali metal gettering agent is most conveniently introduced the furnace 110 as an aqueous solution or slurry. In this regard, the EAF dust can be conveniently analyzed prior to introduction into the furnace 10 to measure its chloride content. Typically, however, EAF dust will contain about 2 wt. % chlorides. The feed of the alkali metal gettering agent will therefore be controlled so that a stoichiometric amount or greater of alkali metal gettering agent is introduced into the furnace 10 to ensure that substantially all free chloride is converted to an alkali metal chloride.

Any non-volatilized material introduced in the feed stream will form a slag 30 in an annular zone around the plasma arc zone which circulates in a direction toward the interior of the furnace—i.e., toward the plasma arc zone. The molten slag will be at a temperature at or above 3,000° F. The slag may periodically be withdrawn from the furnace 10 by means of a side tap (not shown) at a predetermined level and recovered iron from a lower slide tap (not shown), so as to maintain the molten slag in the furnace at acceptable levels. Alternatively, for batch-wise processing, the electrode 20 may be raised upwardly from the iron heel as the slag level increases until such time that the distance between the terminal end of the electrode 20 and the iron heel enables a plasma arc to be formed.

The particle size of the EAF dust is not critical to the successful practice of this invention as the furnace 10 can conveniently process particulate material having a nominal diameter of up to about ⅝-inch. Typical EAF dust and dust agglomerates, however, will have an average particle size of between about 0.001 to about 0.500 inch.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for recovering substantially chloride-free heavy metals from electric arc furnace (EAF) dust comprising the steps of:
   (i) forming a plasma arc in a DC sealed atmosphere plasma arc furnace;
   (ii) introducing EAF dust into the furnace so that the EAF dust is brought into contact with the plasma arc sufficient to form an off-gas which includes heavy metal and chloride vapors, and
   (iii) bringing the off-gas into contact with an alkali metal gettering agent within the sealed atmosphere of the plasma arc furnace so as to form alkali metal chlorides and thereby inhibit the formation of heavy metal chlorides.

2. A process as in claim 1, wherein step (i) is practiced by forming the plasma arc between a terminal end of a hollow electrode and an electrically conductive heel.

3. A process as in claim 2, wherein the EAF dust is introduced into the furnace through the hollow of the electrode.

4. A process as in claim 2, wherein the EAF dust is introduced into the furnace adjacent to the hollow electrode.

5. A process as in claim 1, wherein said EAF dust includes at least one of lead, zinc and cadmium as said heavy metals.

6. A process as in claim 1, wherein said plasma arc is at a temperature of greater than about 3,000° F.

7. A process as in claim 1, which includes forming a molten slag in an annular zone surrounding said plasma arc at a temperature of about 3,000° F.

8. A process as in claim 1, wherein said alkali metal gettering agent is a solution or slurry of an alkali metal oxide, hydroxide or carbonate.

9. A process as in claim 1 or 8, wherein a stoichiometric amount or greater of the alkali metal gettering agent, based on the amount of chloride ions present in the EAF dust, is brought into contact with the off-gas.

10. A process as in claim 9, wherein the alkali metal gettering agent is introduced into the fee gas space above the slag of the plasma arc furnace.

11. A process as in claim 9, wherein a portion of the alkali metal gettering agent is introduced into an off-gas discharge conduit near its connection to the plasma furnace.

12. A process as in claim 8, wherein the alkali metal gettering agent is an oxide, hydroxide or carbonate of sodium or potassium.

13. A process as in claim 12, wherein the alkali gettering agent is sodium hydroxide, sodium carbonate, potassium hydroxide or potassium carbonate.

14. A process for recovering substantially chloride-free heavy metals from electric arc furnace (EAF) dust comprising the steps of:
   (i) forming a plasma arc in a sealed atmosphere of a DC plasma arc furnace between a terminal end of a hollow electrode and an electrically conductive heel;
   (ii) introducing EAF dust into the hollow of the electrode so that the EAF dust is brought into contact with the plasma arc at the electrode's terminal end thereof sufficient to form an off-gas which includes heavy metal and chloride vapors, and
   (iii) bringing the off-gas into contact with an alkali metal gettering agent within the sealed atmosphere of the plasma arc furnace so as to form alkali metal chlorides and thereby inhibit the formation of heavy metal chlorides.

15. A process as in claim 14, wherein said EAF dust includes at least one of lead, zinc and cadmium as said heavy metals.

16. A process as in claim 14, wherein said plasma arc is at a temperature of greater than about 3,000° F.

17. A process as in claim 14, which includes forming a molten slag in an annular zone surrounding said plasma arc.

18. A process as in claim 14, wherein said alkali metal gettering agent is a solution or slurry of an alkali metal oxide, hydroxide or carbonate.

19. A process as in claim 14 or 18, wherein a stoichiometric amount or greater of the alkali metal gettering agent, based on the amount of chloride ions present in the EAF dust, is brought into contact with the off-gas.

20. A process as in claim 19, wherein the alkali metal gettering agent is introduced into the free gas space of the plasma arc furnace.

21. A process as in claim 19, wherein the alkali metal gettering agent is introduced into an off-gas discharge conduit near its connection to the plasma furnace.

22. A process as in claim 18, wherein the alkali metal gettering agent is an oxide, hydroxide or carbonate or sodium or potassium.

23. A process as in claim 22, wherein the alkali gettering agent is sodium hydroxide, sodium carbonate, potassium hydroxide or potassium carbonate.

* * * * *

UNITED STATES PATENT AND TRADEMARK OFFICE
CERTIFICATE OF CORRECTION

PATENT NO. : 5,942,023
DATED : August 24, 1999
INVENTOR(S) : John A. BITLER; John P. BARANSKI; Harold R. LARSON

It is certified that error appears in the above-identified patent and that said letters patent is hereby corrected as shown below:

On the title page:
Page 2, Other Publications:
Line 1, change "Hose" to -Host- Column 3, line 67, change "110" to -10-
Column 6, line 24, Para. 22, change "or sodium" to -of sodium- Signed and Sealed this Twenty-eighth Day of December, 1999

Attest:

Q. TODD DICKINSON

Attesting Officer        Acting Commissioner of Patents and Trademarks